(12) United States Patent
Zelakiewicz et al.

(10) Patent No.: US 7,915,591 B2
(45) Date of Patent: Mar. 29, 2011

(54) MASK FOR CODED APERTURE SYSTEMS

(75) Inventors: Scott Stephen Zelakiewicz, Niskayuna, NY (US); Jeffrey Seymour Gordon, Niskayuna, NY (US); Floribertus Heukensfeldt Jansen, Ballston Lake, NY (US)

(73) Assignee: Morpho Detection, Inc., Newark, CA (US)

( * ) Notice: Subject to any disclaimer, the term of this patent is extended or adjusted under 35 U.S.C. 154(b) by 247 days.

(21) Appl. No.: 12/122,471

(22) Filed: May 16, 2008

(65) Prior Publication Data

US 2009/0114824 A1 May 7, 2009

Related U.S. Application Data

(60) Provisional application No. 60/971,698, filed on Sep. 12, 2007.

(51) Int. Cl.
*G01T 1/36* (2006.01)
(52) U.S. Cl. .................................. 250/363.06
(58) Field of Classification Search ............. 250/363.06
See application file for complete search history.

(56) References Cited

U.S. PATENT DOCUMENTS

| | | | |
|---|---|---|---|
| 5,036,546 A * | 7/1991 | Gottesman et al. | 382/321 |
| 6,194,728 B1 * | 2/2001 | Bosnjakovic | 250/370.11 |
| 6,205,195 B1 | 3/2001 | Lanza | |
| 6,236,050 B1 * | 5/2001 | Tumer | 250/370.09 |
| 6,737,652 B2 | 5/2004 | Lanza et al. | |
| 7,183,554 B2 | 2/2007 | Gallagher et al. | |
| 7,214,947 B2 | 5/2007 | Bueno et al. | |
| 2006/0065844 A1 | 3/2006 | Zelakiewicz et al. | |
| 2006/0284094 A1 | 12/2006 | Inbar | |
| 2009/0008565 A1 * | 1/2009 | Gottesman | 250/370.06 |

* cited by examiner

*Primary Examiner* — David P Porta
*Assistant Examiner* — Shun Lee
(74) *Attorney, Agent, or Firm* — Armstrong Teasdale LLP

(57) ABSTRACT

A detector for identification and localization of radioisotopes, comprising a position sensitive detector configured to observe the location of emitted high energy radiation, wherein the position sensitive detector comprises a surface comprised of a first radiation sensitive material; and an active mask disposed in front of the position sensitive detector positioned such that the emitted high energy radiation is detected by the position sensitive detector after passage through the mask, wherein the mask comprises a second radiation sensitive material.

20 Claims, 6 Drawing Sheets

MASK FOR CODED APERTURE SYSTEMS

CROSS-REFERENCE TO RELATED APPLICATIONS

This application claims the benefit of U.S. Provisional Application Ser. No. 60/971,698, filed Sep. 12, 2007, which is incorporated herein by reference in its entirety.

BACKGROUND

The present disclosure generally relates to masks for coded aperture systems and methods of using the masks, and more particularly, to masks that maximize the efficiency for stand-off radiation detection and imaging systems.

Given the desire of terrorist organizations to obtain nuclear weapons or other radiological weapons such as "dirty" bombs, serious efforts are being made to assess this nation's vulnerabilities and to enhance the nation's security. Potential areas of vulnerability can include, for example, seaports, airports, urban areas, borders, stadiums, points of interest, and the like. In U.S. seaports, for example, an average of about 16,000 cargo containers arrive by ship every day, any one of which could be used to conceal fissile material or an assembled nuclear device. Furthermore, once in the country, the nuclear material could travel virtually anywhere in the country with little to no detection capability.

A currently prevailing model for addressing such threats associated with potentially reactive material could be characterized as a customs-based approach, where radiation detection systems are integrated into the existing customs infrastructure at ports and border crossings. Once the containers leave the customs area, additional screening methods are required to investigate potential threats once within the county's borders.

Several methods exist for detecting nuclear material once within the nation's borders. These systems largely consist of devices which can detect radiation but neither definitely locate the source or discriminate between naturally occurring sources of radiation and genuine threats. The devices include small pager-size devices and larger Geiger-counter based detectors. These devices rely on measuring a local increase in the detection of gamma-rays to determine the presence of radioactive material. Because they do not perform any imaging or energy discrimination, they often indicate false-positive threats potentially leading to ignoring true threats. To passively detect and locate radioactive material that could be used in potential terrorism threats domestically, several technologies have been considered. Attenuating collimators to achieve the radioactive localization suffer from low efficiencies and can have significant weight issues to attenuate high energy gamma-rays. Compton cameras can be used due to their localization abilities, but their inherent inefficiencies at low radiation energies, high cost, and high system complexity make them undesirable for such applications.

Systems for detecting radioactive material can employ coded aperture imaging. Coded aperture imaging provides a means for improving the spatial resolution, sensitivity, and signal-to-noise ratio (SNR) of images formed by x-ray or gamma ray radiation. In contrast to these other systems, for instance, the coded aperture camera is characterized by high sensitivity, while simultaneously achieving exceptional spatial resolution in the reconstructed image.

Sources of such high energy electromagnetic radiation (i.e., X-ray, gamma-ray or neutron sources) are generally imaged by coded aperture arrays onto a detector which has detector elements arranged in a pattern of rows and columns. Imaging techniques based on coded apertures have been successfully applied by the astrophysics community, and are now being developed for national security purposes.

Current coded aperture systems utilize a mask with multiple, specially-arranged pinholes or transmission regions to increase the overall photon transmission, and hence the sensitivity, of the imaging camera. In operation, radiation from the object to be imaged is projected through the coded aperture mask and onto a position-sensitive detector. The coded aperture mask contains a number of discrete, specially arranged elements that are either opaque or transparent to the incident photons. Every point source within the detector's field of view casts a shadow of the aperture pattern onto the detector plane. Each shadow is displaced an amount commensurate with the angular displacement of the point source from the system's central axis. The sum total of the radiation pattern recorded by the detector constitutes the "coded" data, which usually bears no resemblance to the actual source. The raw signal from the detector does not reflect a directly recognizable image, but instead represents the signal from the object that has been modulated or encoded by the particular aperture pattern. This recorded signal can then be digitally or optically processed to extract a reconstructed image of the object. In addition, the data can be further processed to extract spectroscopic information to determine the type of source that emitted the radiation.

The aperture mask is typically a one- or two-dimensional planar array of the occluding and transmission regions. The mask, particularly the occluding (i.e. opaque) regions, can be made of an attenuating material. Examples of attenuating materials suitable for aperture masks can include tungsten, lead, and the like. Prior art FIG. 1, is a simplified illustration of a standard aperture mask 10 in front of a position sensitive detector (PSD) 12. The PSD 12 detects radiation emitted from a radiation source 16. The angle subtended by the mask 10 and the PSD 12 determines the field of view, i.e., the fully encoded region. Dashed lines 14 are shown to represent the field of view. As can be seen, the larger the mask, the wider the field of view. The mask, therefore, is often made larger to trade off the overall detector size for a wider field of view. This can be undesirable, however, for radiation detection systems that are meant to be portable since it means a relatively small fraction of the overall detection system size will be sensitive to the incident radiation. Moreover, a typical aperture mask, such as the mask 10, can reduce the efficiency of the detector to less than 50 percent even if half of its area is transparent to the radiation. In other words, the mask is one of the main determining factors in the size and efficiency of the detection system when it is being used to identify the location and specific isotopes of the source of the radiation.

To reiterate, a standard coded aperture system with a typical coded mask can be used, but suffers from a modest radiation sensitive area and limited efficiency. Such a standard coded aperture system, therefore, may not be desirable for a standoff radioactive imaging system application, particularly wherein it is desirable for the system to be easily portable and highly efficient.

BRIEF SUMMARY

Disclosed herein are embodiments of an improved coded aperture mask, imaging system, and methods of using the same. In one embodiment, a detector for identification and localization of radioisotopes includes a position sensitive detector configured to observe the location of emitted high energy radiation, wherein the position sensitive detector comprises a surface comprised of a first radiation sensitive material; and an active mask disposed in front of the position sensitive detector positioned such that the emitted high energy radiation is detected by the position sensitive detector after passage through the mask, wherein the mask comprises a second radiation sensitive material.

In another embodiment, a stand-off radiation imaging and identification system, includes a detector configured to identify and locate a radioisotope. The detector includes a position sensitive detector configured to observe the location of a high energy radiation source, wherein the position sensitive detector comprises a surface comprised of a first radiation sensitive material; and an active mask comprising a plurality of attenuating and transparent elements disposed in front of the position sensitive detector, wherein the plurality of attenuating elements are comprised of a second radiation sensitive material and are configured to provide shadowing attenuation to the position sensitive detector energy information for identification of the radioisotope.

A method of detecting a source of radioisotopes includes loading a stand-off radiation imaging and identification system aboard a vehicle, wherein the system is configured to detect the radiation from a radioisotope source and comprises a detector configured to identify and locate a radioisotope, wherein the detector comprises a position sensitive detector configured to observe the location of a high energy radiation source interaction, wherein the radiation detected by the position sensitive detector can be used for identification of the source radioisotope, wherein the position sensitive detector comprises a surface comprised of a first radioisotope sensitive material; and a mask comprising a plurality of attenuating and transparent elements disposed in front of the position sensitive detector, wherein the plurality of attenuating elements are comprised of a second radiation sensitive material; providing shadowing attenuation to the position sensitive detector with the active mask; providing energy information for the radiation allowing identification of the radioisotope with the second radioisotope sensitive material of the active mask; recording detection of the radioisotopes by the system; and determining the location of the radiation source.

These and other features and advantages of the embodiments of the invention will be more fully understood from the following detailed description of the invention taken together with the accompanying drawings. It is noted that the scope of the claims is defined by the recitations therein and not by the specific discussion of features and advantages set forth in the present description.

Skilled artisans will appreciate that elements in the figures are illustrated for simplicity and clarity and have not necessarily been drawn to scale.

DETAILED DESCRIPTION OF EMBODIMENTS OF THE INVENTION

Disclosed herein is a process for improved efficiencies as it relates to a stand-off radiation detection and imaging system. The system comprises a coded aperture for detecting and resolving multiple radioactive sources. Particularly, disclosed herein is an improved mask for the coded aperture of the system. The mask and a position sensitive detector can be used to form a detector for identification and localization of radioisotopes. The mask maximizes the detection efficiency per unit area for a radiation sensitive detector and provides localization of the radiation source, while minimizing the overall size (i.e., footprint) of the radiation imaging system. The detector and the mask, therefore, may be produced with the smallest possible volume for a given radiation detection efficiency. The stand-off radiation imaging system, therefore, can be of a size suitable for transportation in a vehicle, such as a sport-utility vehicle (SUV), van, pick-up truck, and the like.

Figure 1:
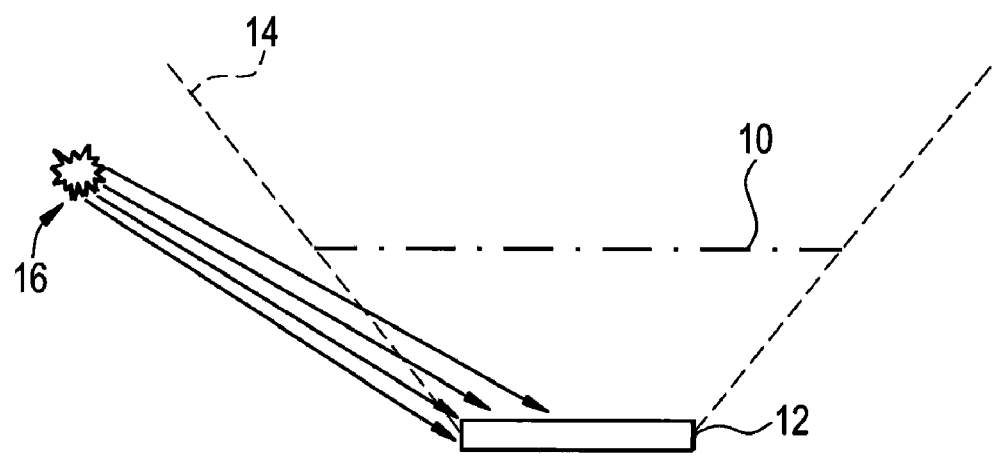
FIG. 1 schematically illustrates a prior art coded aperture system.
Figure 2:
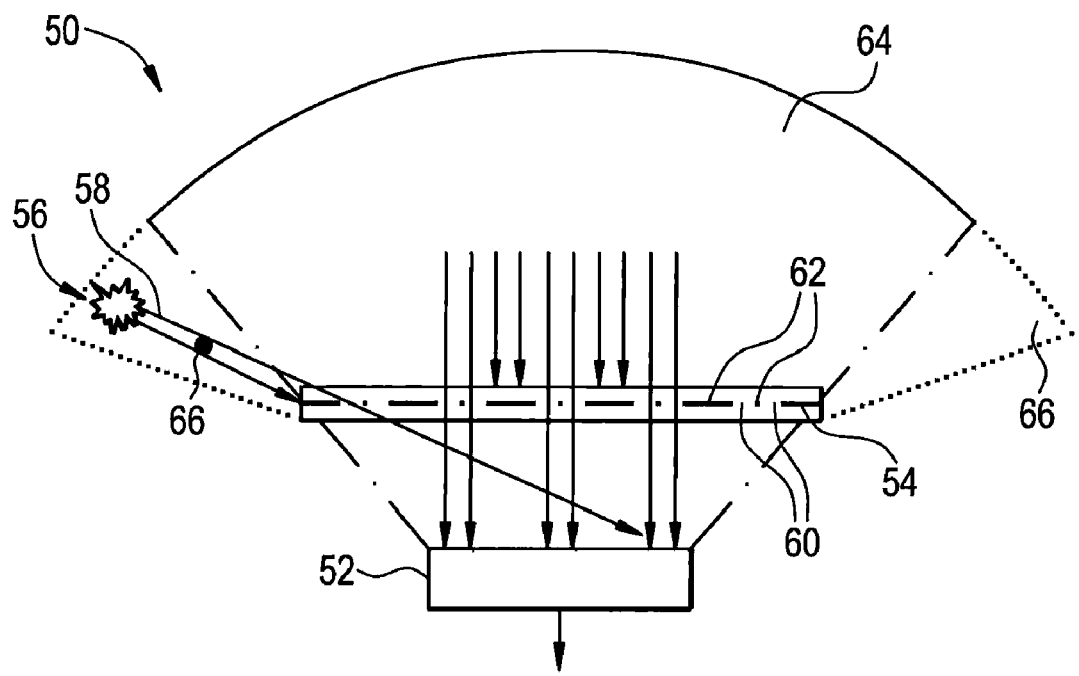
FIG. 2 schematically illustrates a second prior art coded aperture system comprising a linear mask and shows the fully encoded field of view for the system.

Turning now to FIG. 2, another prior art coded aperture 50 is illustrated. In simple terms, the coded aperture 50 comprises a position-sensitive detector (PSD) 52 and a coded aperture mask 54 disposed between the PSD 52 and a radiation source 56. The radiation source 56 emits radiation 58, such as, but not limited to, x-ray and/or gamma-ray radiation, that is modulated by the coded aperture mask 54 and impinges upon the PSD 52. The mask 54 can generally be made of attenuating material. As used herein, "attenuating material" is used to generally define any material that reduces the intensity of a collection of x-rays or gamma-ray. Exemplary attenuating materials can include tungsten, lead, linotype, and the like. As illustrated in prior art FIG. 2, the mask 54 generally comprises a plurality of open transparent regions 60 and closed regions 62 that are attenuating to the radiation emitted by the source. In an exemplary embodiment, the closed attenuating region can be opaque to the incident radiation. The mask casts a shadow, patterned with the open 60 and closed 62 regions, on the PSD 52. The shadow can shift position depending on the source's location. The fully coded region 64 of the coded aperture 50 is illustrated by the darkened section, and partially coded regions 66 of the coded aperture 50 are illustrated by the dotted sections. The fully coded region 64 is the area in the field of view of the detector 52. The coded aperture can resolve and locate a radioactive source in this region. Further, the mask decreases the overall efficiency of the detector since a smaller fraction of the total system size is sensitive to radiation. In fact, the mask can reduce the efficiency of the detector system to less than 50%, depending upon how much of the PSD surface is covered by the mask and the size of the mask compared to the size of the PSD. If the mask was the same size as the PSD, the best possible efficiency is about 50%. If the mask is larger than the PSD, the efficiency of the overall detection system will drop below this value. Due to these inefficiencies, spectral information that can be obtained from the PSD is limited since only a fraction of the incident radiation is detected and recorded.

The coded aperture radiation detection system as disclosed herein has a higher efficiency than standard coded aperture systems at a size that can be transported in a vehicle, such as an SUV, a small aircraft, boat, and the like. The mask of this exemplary coded aperture system is advantageously comprised of a radiation sensitive material. The coded aperture system herein, therefore, is capable of radiation source identification and direction determination of X-rays and gamma-rays with high efficiency. In an exemplary embodiment, the coded aperture detection system comprising an active mask increases the system efficiency, when compared to a system comprising a passive mask, by greater than about 50%, specifically greater than about 100%, depending on the efficiency of the PSD. The "active" mask (i.e. the mask constructed of radiation sensitive material) provides two major benefits. First, the active mask provides shadowing attenuation to the position sensitive detector (which is basically a second detector that is pixelated) located behind the mask that contributes to source position determination. Second, the active mask provides energy information, which contributes to source isotope identification. In a typical coded aperture detection system, the mask can cover 50% or more of the PSD surface. An active mask, therefore, can substantially increase the overall detection efficiency of the system compared to a system comprised of a passive mask providing similar attenuation. Since the mask and the PSD are capable of resolving the energy of the incident radiation (e.g., gamma-rays), the total efficiency of the radiation detection system will be higher compared to existing X-ray coded aperture detection systems. By having an aperture mask comprised of an active material, the maximum detection efficiency per unit area for an X-ray PSD is afforded. The PSD and mask, therefore, can be produced with the smallest possible volume and cost for a given desired X-ray detection efficiency. Moreover, the active mask can provide a detection system wherein isotope identification and localization can be calculated in less time per detection volume than existing X-ray detection systems.

Figure 3:
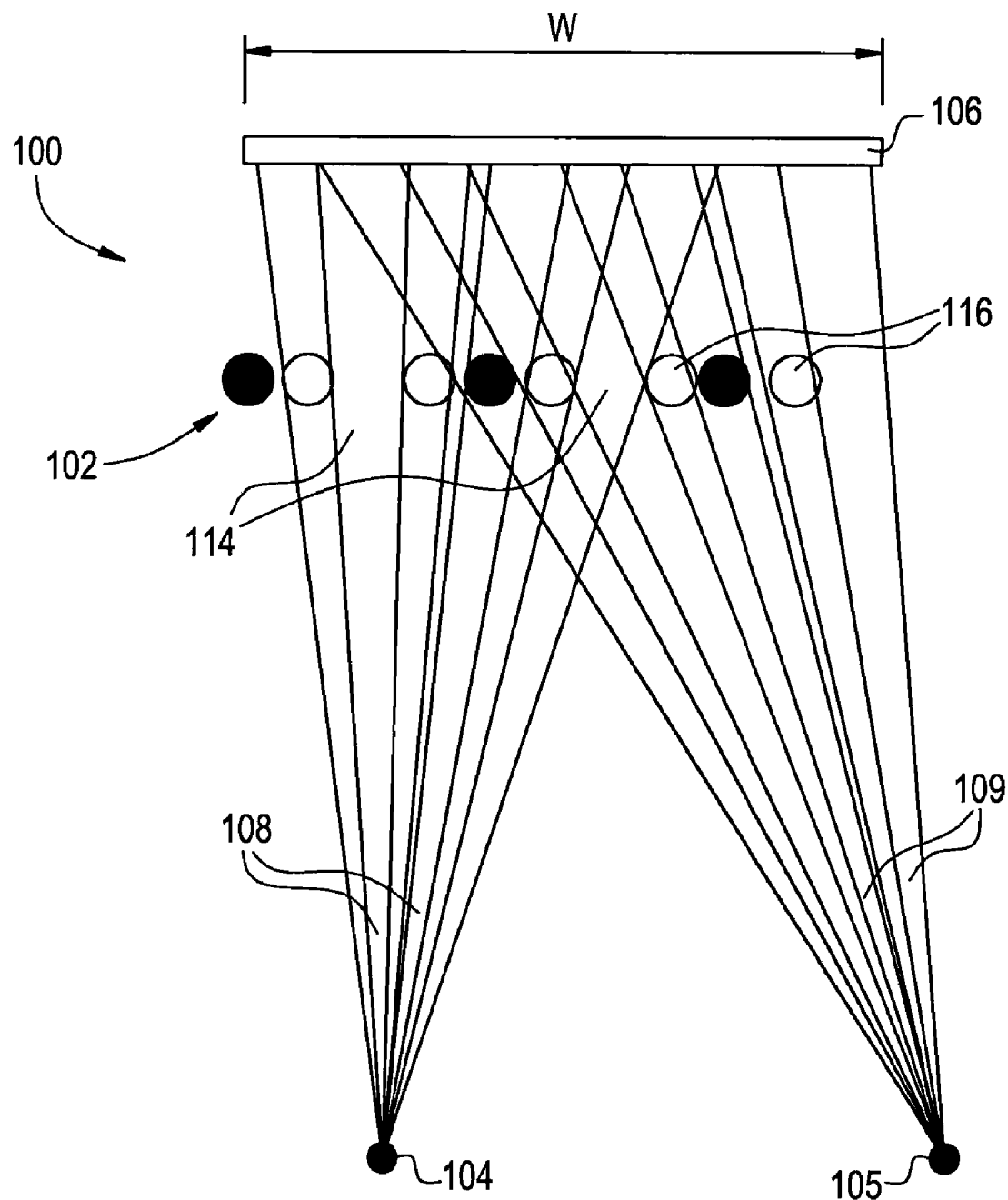
FIG. 3 schematically illustrates an exemplary embodiment of an active mask of a detector for identifying and locating radioisotopes.

FIG. 3 illustrates an exemplary embodiment of a coded aperture 100 comprising an active mask 102. The active mask 102 is disposed between two radiation sources 104, 105 and a PSD 106. The mask is configured to provide shadow attenuation for the PSD. The mask 102 is comprised of a radiation sensitive material. Particularly, the material is a material that is sensitive to X-ray and gamma-ray radiation energy. The active mask 102 is disposed in front of and parallel to the PSD 106. The active mask 102 can be spaced a suitable distance from the PSD 106 and will depend upon, among other things, the dimensions of the PSD, the PSD pixel size, the spatial resolution of the PSD, the desired angular resolution, and the like. In an exemplary embodiment, the active mask 102 is separated from the PSD 106 by a distance of about 10 centimeters (cm) to about 100 cm, specifically about 60 cm. The active mask 102 can have any dimensions suitable for providing a given efficiency to a detection system. In one embodiment, the active mask 102 can have the same dimensions of the PSD 106. In other embodiment, the active mask 102 can have a width less than a width ('w') of the PSD 106. In still another embodiment, the active mask 102 can have a width greater than the width of the PSD 106. Likewise, the overall height of the active mask 102 can be approximately at least as long as the PSD 106. The active mask can have any shape comprising any number of pieces (i.e., sides), depending on the PSD size and shape and the desired overall detection system efficiency. In one embodiment, the active mask has a linear shape. In another embodiment, the active mask is non-linear, for example, rectangular, arcuate, polygonal, and the like.

The mask 102 further comprises a plurality of open transparent regions 114, and closed (e.g. attenuating) regions 116 that can be substantially opaque to the radiation emitted by a source. The mask casts a shadow, patterned with the open 114 and closed 116 regions, on the PSD 106. The shadow can shift position depending on the source's location. The shadows for the two sources are indicated by the reference numerals 108 and 109 respectively. In one embodiment, the active mask can be a single piece (e.g., a sheet) comprising the open and closed regions. In another embodiment, as shown in FIG. 3 however, the open and closed regions of the active mask are comprised of a plurality of individual transparent elements 114 and attenuating elements 116. The elements can be arranged in any configuration suitable for attenuation and proper functioning of the PSD and detector system. Elemental configuration is well known to those skilled in the art, and in exemplary embodiments, the elements will follow a pseudo-random (i.e., non-periodic) sequence. The attenuating elements 116 of the active mask are advantageously comprised of a radiation sensitive material. Exemplary radiation sensitive materials can include, without limitation, scintillation materials and direct detection materials. Exemplary scintillation materials from which to construct the attenuating mask elements can include, without limitation, sodium iodide, cesium iodide, sodium iodide thallium, gadolinium oxyorthosilicate (GSO), bismuth germinate (BGO), and lutethium oxyorthosilicate (LSO). These scinitillation materials can be connected to a variety of light detection mechanisms such as photomultiplier tubes (PMT) and semiconductor photo-diodes with various coupling methods that are well known to those skilled in the art. Exemplary direct detection materials from which to construct the attenuating elements can include, without limitation, high purity germanium, cadmium zinc telluride (CZT) and cadmium telluride, or any other material utilized to directly convert gamma or x-ray radiation into an electrical signal. As stated previously, the radiation sensitive material of the attenuating elements are sensitive to X-ray and gamma-ray radiation and provide the active mask described herein. While both active and passive (i.e., existing) mask can attenuate the radiation to construct a shadow pattern on the PSD for location purposes, the active mask is also able to advantageously detect the absorbed x-rays and gamma-rays. The transparent elements 114 in the case of FIG. 3 are simply apertures (e.g. empty space) in the active mask. In another embodiment, the transparent elements 114 can be comprised of a transparent material, which permits transmission of the radiation light through the element and onto the PSD 106.

Figure 4:
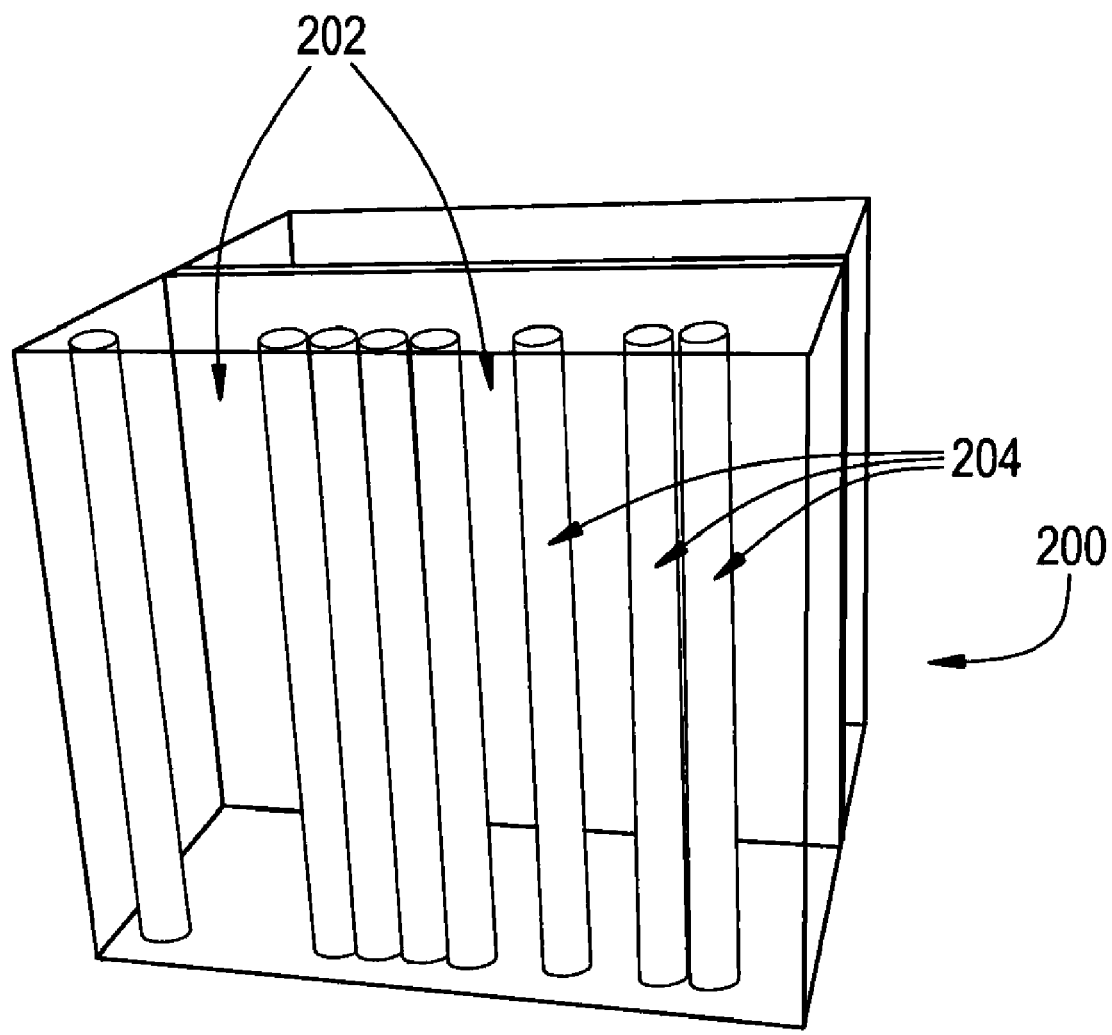
FIG. 4 schematically illustrates an exemplary embodiment of an active mask comprising a plurality of transparent and attenuating cylindrically shaped elements.

The elements can have any size, shape, and configuration suitable for providing the maximum possible photopeak efficiency for the detection system. Shapes can include, for example, cylindrical, rectangular, polygonal, planar, and the like. FIG. 4 illustrates an exemplary embodiment of an aperture mask 200 comprising a plurality of apertures 202 and opaque elements 204, all having a cylindrical shape. The cylindrical elements can have any size, which will depend, among other things, on the size of the PSD. In one embodiment, the opaque elements can have a 3-inch diameter and an aspect ratio of about 5 to 1. For example, the opaque elements 204 can comprise 3-inch diameter cylindrical sodium iodide thallium (NaI(T1)) detector elements. When such an active mask 200 is combined with a PSD having a planar 1-inch thick NaI(T1) crystal detection surface, a detection system having a total photopeak efficiency of at least about 35% can be achieved. About 25% of the gammas go to photopeak due to the active mask, and about 10% of the gammas go to photopeak due to the PSD. If a PSD having a 3-inch thick NaI(T1) crystal detection surface is used, the detection system can have a total photopeak efficiency of at least about 60%. In this case, about 25% of the gammas go to photopeak due to the active mask, and about 35% of the gammas go to photopeak due to the PSD. In one exemplary embodiment, a detection system with a PSD and mask that each extend to 1 meter square area comprising the active mask can detect at least about 25 gammas per second for a 1 milliCurie (mCi) Cesium 137 ($^{137}Cs$) source located 100 meters (m) away, and more specifically at least about 60 gammas per second. The total gammas included in the photopeak are determined by summing the total counts contained within plus or minus 46 kiloelectron volt (keV) of the 662 keV photopeak.

Figure 5:
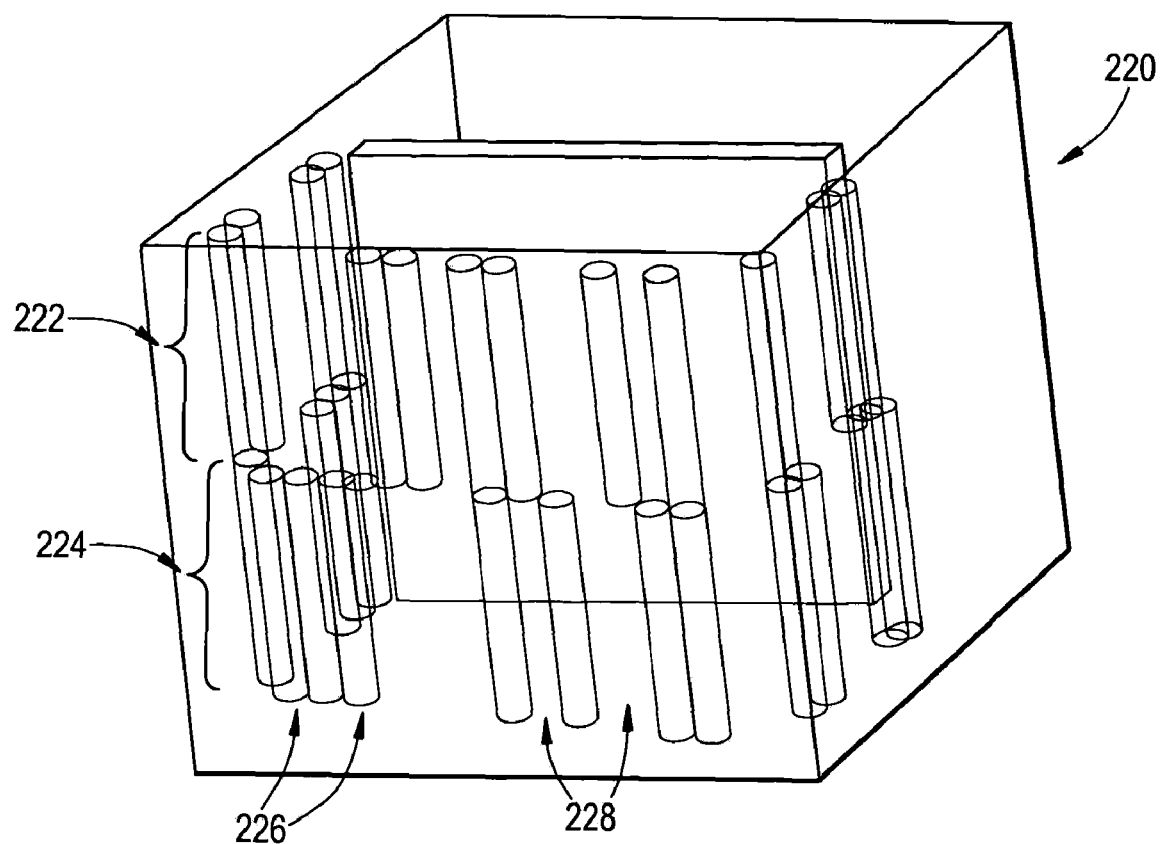
FIG. 5 schematically illustrates an exemplary embodiment of an active mask comprising two tiers of a plurality of transparent and attenuating cylindrically shaped elements.

Both the attenuating and the transparent elements can have a length that extends the full length of the PSD, i.e., the element length extends from the top of the PSD to the bottom, thereby occupying the full length of the coded aperture mask. In other embodiments, the elements extend only a portion of the length of the PSD. In these embodiments, therefore, multiple tiers of elements can be used to form the coded aperture mask and to completely cover the PSD. For example, FIG. 5 illustrates a two-tiered elemental mask 220, wherein the mask is split into an upper portion 222 and a lower portion 224 of cylindrical attenuating elements 226 and apertures 228. The length of the mask elements, therefore, is half the height of the overall PSD. Each portion of the two-tiered active mask 220 can have a distinct permutation of the elements 226 and can achieve two-dimensional imaging. In other embodiments, the mask may have greater than two tiers. One of the advantages of having multiple tiers of elements in the active mask array structure is that the reduction in aspect ratio of the elements can help to improve the energy resolution when compared to a single tier of elements covering the full length of the PSD due to better light collection efficiency. Moreover, a multi-tiered active mask allows the ability to locate the radiation source in a height direction as well.

Several methods exist to determine the placement of the opaque and transparent elements in the coded aperture mask and they are well known to those skilled in the art. In one exemplary method, pseudo-noise sequences are used to determine the array element order in the mask. Pseudo-random or pseudo-noise (PN) sequences are well known in communications theory. These are binary sequences of length $2^m-1$, where m is an integer representing the number of digits in the sequence. For example, the sequence of m=3 is {101}. The sequence for m=4 is given by the cyclic permutation of the binary sequence {000100110101111}. The elements of the coded aperture array have assigned values of either 0 or 1, depending on whether the elements is an opaque (filled) element (value=1) or a transparent element (a void) (value=0). In one embodiment, therefore, the active mask as described herein can have a front section with a single PN sequence m=4, and side sections consisting of shorter PN sequences (e.g., m=3), wherein opaque elements fill the one positions of the sequence and the zero positions are left open or filled with transparent elements.

For radiation sensitive material based mask elements comprising scintillation materials, the light generated due to the absorption of energy from the gamma ray is detected by any number of methods. These include, but are not limited to, photo-multiplier tubes (PMTs) and photo diodes. For the one and two tier masks, these detection elements could be placed at the ends of the elements thereby limiting any impact of the gamma rays to be detected in the PSD. In another embodiment, the PMT or photo-diode could be placed between the mask scintillating material and the PSD allowing arbitrary complexity in the design of the mask pattern. All the mask elements are held in a fixed position relative to the PSD.

The coded aperture mask 102 casts a shadow upon the PSD 106 and by observing the location of the shadow image on the PSD, the radiation source location can be determined. The active mask of this disclosure can advantageously be employed with any PSD configured to operate with a standard (i.e., non-active) aperture mask. A radiation source can generally be treated as comprising multiple point sources, each of which emits radiation. Each of these point sources casts a particular shift of the coded aperture pattern on the PSD 106. Thus, many different shifts, corresponding to the different point sources comprising the radiation-emitting source, are superimposed on the detector. The PSD 106 provides detection signals corresponding to the energy and pattern of the emitted radiation, and a processor (not shown) can subsequently characterize the object by reconstructing a visible image of the object. The image can then be sent to a display for illustrating the reconstructed object image.

The PSD 106 can comprise a two-dimensional detector array, where the detection plane elements correspond to either a defined region of a continuous detector, or individual detector units spanning the entire area in which the coded aperture casts a shadow. The detector array has a surface comprised of a radiation sensitive material. This material can be a scintillation material including, without limitation, sodium iodide, cesium iodide, gadolinium oxyorthosilicate (GSO), bismuth germinate (BGO), and lutethium oxyorthosilicate (LSO), or any other material utilized to convert gamma or x-ray radiation into ultraviolet, visible or infrared light. The scintillators can be constructed as discrete elements or as a single large crystalline sheet. The radiation sensitive material of the PSD can also be a direct detection type material including, but not limited to, cadmium zinc telluride (CZT) or cadmium telluride. In one embodiment, the radiation sensitive material of the PSD and the radioisotope sensitive material of the active mask are the same. In another embodiment, the materials of the active mask and the PSD are different. In yet another embodiment, the active mask and PSD can be made of a scintillator or a direct detection material or any combination thereof. For example, the PSD and active mask can be made of the same scintillating material, different scintillating materials, a scintillating material and a direct detection material, the same direct detection materials, or two different direct detection materials. An array of photomultiplier tubes (PMTs) is typically used in conjunction with the PSD, when scintillation material is used, to accurately record the incident radiation, including its energy and position. Conventional detector arrays, such as an Anger camera, including gamma cameras may be employed. In one embodiment, the PSD 106 can be an Infinia® gamma camera manufactured by General Electric. One suitable PSD arrangement, for example, is to employ a scintillating material in conjunction with a plurality of photomultipliers. Other detectors could include noble gas ionization chambers or solid state materials such as high purity germanium, cadmium zinc telluride (CZT), or cadmium telluride. In an exemplary embodiment, the PSD 106 comprises four gamma cameras, for example the GE Infinia® gamma cameras described above, all tiled together. A standard GE Infinia® gamma camera comprises a one-inch thick planar sodium iodide thallium CNaI(T1)) crystal scintillator, read out by an array of 95 PMTs. The signals from the multiple PMTs are used to reconstruct the position and energy of the interacting gamma rays. The gamma camera of this system can have a photopeak efficiency of about 10% of the incident radiation at 662 keV. However, as described above, use of the active mask can increase the efficiency of the entire system to as much as about 35%. Increasing the scintillator thickness (e.g., to about 2-3 inches) can increase the photopeak efficiency. At a one inch scintillator thickness, the GE gamma camera has a full width at half maximum (FWHM) spatial resolution of about 4.5 millimeters (mm) and an energy resolution of 9.8% at 140 keV. The dimension of each of the gamma cameras is 54 centimeters (cm) by 40 cm. Four cameras, therefore, can be tiled together to create a one square meter-class PSD. As a note, tiling seams between the cameras are not considered an issue since the reconstruction methods can account for any non-responsive areas of the PSD.

As stated above, in an exemplary embodiment both the active mask and the PSD together form a coded aperture system capable of detecting at least 35 photons in the 662 keV photopeak from a $^{137}$Cs source of strength 1 mCi at a distance of 100 m in 1 second. In a specific embodiment, the system can detect 60 photons throughout the field of view in the 662 keV photopeak from a $^{137}$Cs source of strength 1 mC at a distance of 100 m in 1 second. Moreover, the system can have an energy resolution of greater than about 7.5% at 662 keV and greater than about 17% at 122 keV for scintillation-based detection, specifically greater than about 2% at 662 keV and greater than about 5% at 122 keV for direct detection materials. The active mask can provide the system with an efficiency greater than that of the same detection system employing a non-active mask. Moreover, the active mask maximizes the information provided to the alarm algorithm of the system and to reduce the number of false alarms and the time in which it takes to identify and locate the source.

Figure 6:
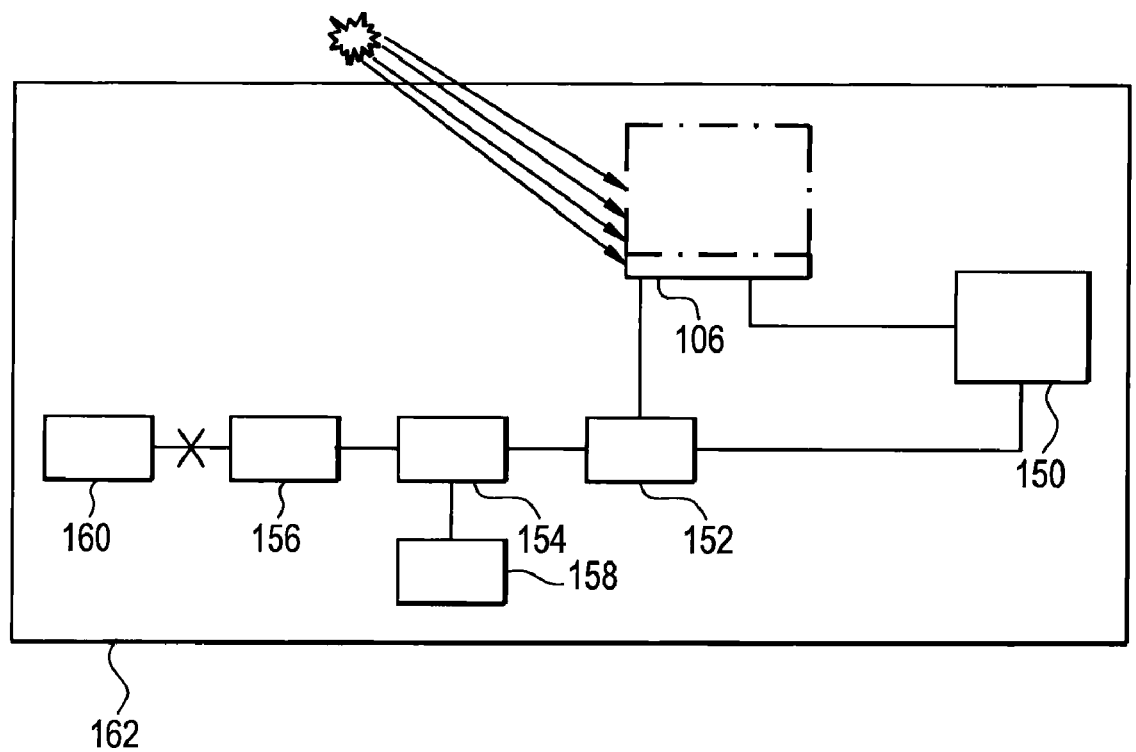
FIG. 6 schematically illustrates an exemplary embodiment of a detection system comprising a coded aperture with an active mask.

As shown in FIG. 6, the PSD 106 can be powered by a power source 150 (e.g., a battery or a generator). The power source 150 can also power signal-processing electronics 152, a computer 154, a transmitter 156, a local transponder 158, and a receiver 160 for remote access. A portion or all of the imaging system can be further held within a container 162 for ease in transport.

The computer 154 (e.g., a personal computer, preferably a laptop for transportability) receives data from a multi-channel signal processor 152 and processes the information. Data processing includes not only normal background-reduction algorithms, but also reconstruction of the coded-aperture image and spectral identification code for the detected radiation. The computer 154 can be directly linked to the transmitter 156 so that the data can be sent.

Figure 7:
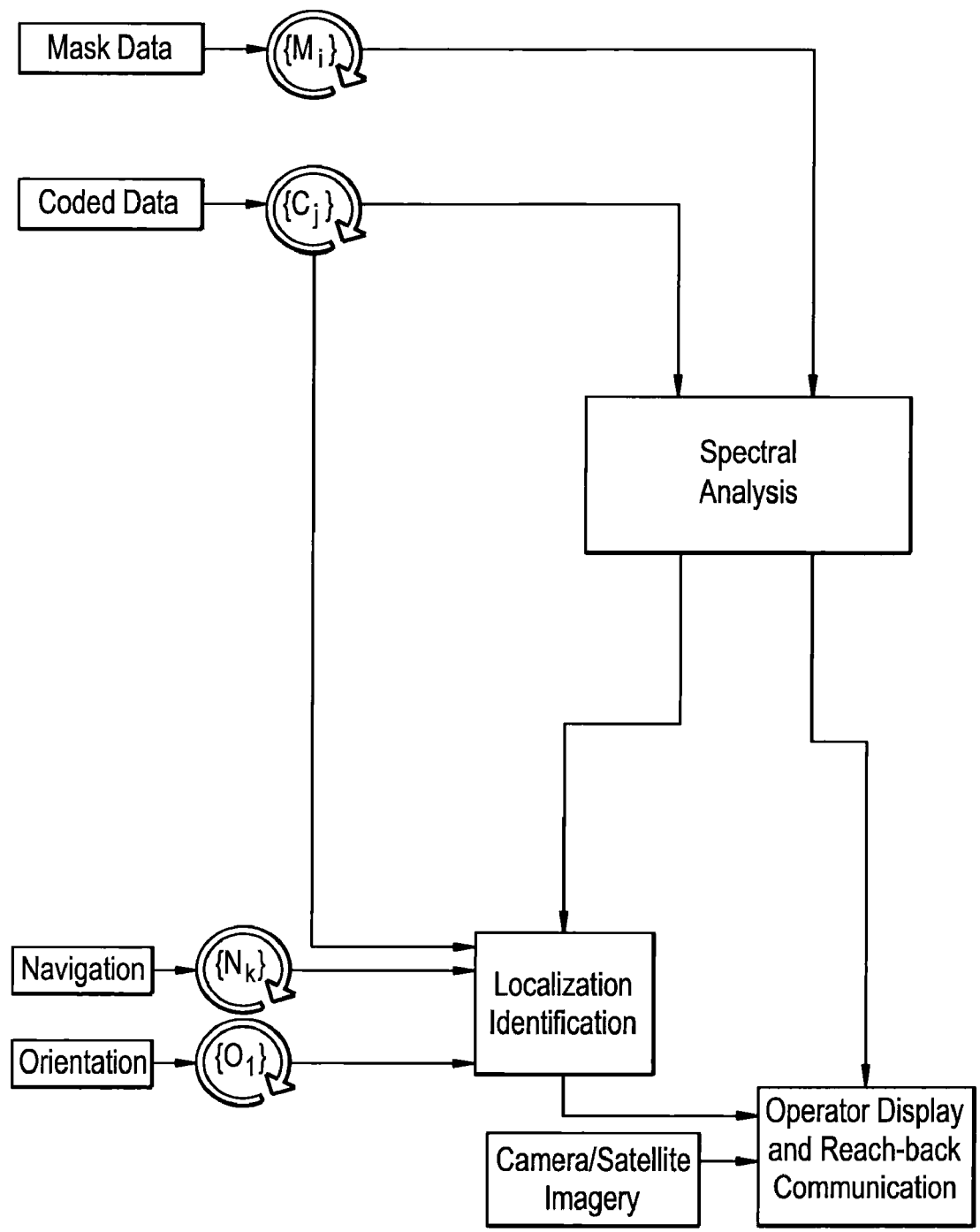
FIG. 7 is a flow diagram illustrating an exemplary embodiment of the stand-off radiation imaging and detection system.

Data from the PSD 106 and active mask will be used to identify the isotope of the radiation source. These algorithms can include early warning low-statistics anomaly and threat algorithms and/or high-statistics isotope identification algorithms. In an exemplary embodiment a threat and anomaly alarm algorithm (TAAA) can be used with the system for threat identification, i.e., the identification of potentially hazardous radioactive sources. The algorithm will permit the early detection of threats, well before standard peak-finding techniques could be applied, while eliminating the effects of varying backgrounds (e.g., medical use radiation). A radiation detection system, particularly a stand-off mobile detection system, must deal with nuisance alarms (such as from medical isotopes), as well as systematic variations in background, when traveling and operating in search mode. As stated above, the entire coded aperture and system components can be packaged together to make a single stand-off radiation detection system unit, which can advantageously fit inside a commercial SUV, van, pick-up truck, helicopter, boat, or the like. The system will function as a mobile unit for detecting and locating a radiation source in a range of several meters to greater than 100 meters from the detector. FIG. 7 illustrates a flow diagram of an exemplary embodiment of the system in operation. Coded data ($C_j$) can be obtained from the PSD and contains both energy and position information from gamma rays emitted by the source to determine the source location, as well as to provide spectral information about isotopes. The navigation ($N_k$) and orientation ($O_l$) data can also be used from their respective modules. All spectral information can be provided to the threat and the isotope algorithms.

Advantageously, the use of an active mask as described herein can allow for a coded aperture radiation detection system with a higher efficiency than a system employed with an existing mask composed of non-radiation sensitive material. The increase in efficiency without an increase in PSD size can, thereby, reduce the size of the system. This reduced system size advantageously permits the system to be contained in a mobile unit, such as the cargo compartment of an SUV for example. The stand-off radiation imaging system can, therefore, be used to actively search cities and other areas of high probability of a nuclear attack wherein current imaging systems are impractical for use.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of the terms "first", "second," and the like do not imply any particular order, but are included to identify individual elements. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the embodiments of the invention belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

While embodiments of the invention have been described with reference to exemplary embodiments, it will be understood by those skilled in the art that various changes can be made and equivalents can be substituted for elements thereof without departing from the scope of the embodiments of the invention. In addition, many modifications can be made to adapt a particular situation or material to the teachings of embodiments of the invention without departing from the essential scope thereof. Therefore, it is intended that the embodiments of the invention not be limited to the particular embodiment disclosed as the best mode contemplated for carrying out this invention, but that the embodiments of the invention will include all embodiments falling within the scope of the appended claims.

The invention claimed is:

1. A detector for identification and localization of radioisotopes, the detector comprising:
   a position sensitive detector configured to observe a location of emitted high energy radiation, the position sensitive detector comprising a surface comprising a first radiation sensitive material, a surface of the position sensitive detector positioned within a plane; and
   an active mask positioned between a source of the high energy radiation and the position sensitive detector, the active mask comprising a plurality of attenuating elements formed from a second radiation sensitive material and a plurality of transparent elements through which the high energy radiation passes for detection by the position sensitive detector, wherein each attenuating element of the plurality of attenuating elements is configured to resolve an energy of the high energy radiation absorbed by the plurality of attenuating elements to identify the source of the high energy radiation.

2. The detector of claim 1, wherein the first radiation sensitive material and the second radiation sensitive material comprise the same material.

3. The detector of claim 1, wherein the first radiation sensitive material and the second radiation sensitive material comprise different materials.

4. The detector of claim 1, wherein at least one of the first radiation sensitive material and the second radiation sensitive material comprises at least one of a scintillation material and a direct detection material, the scintillation material comprising at least one of sodium iodide, cesium iodide, sodium iodide (thallium), gadolinium oxyorthosilicate, bismuth germinate, and lutethium oxyorthosilicate, and the direct detection material comprising at least one of germanium, cadmium zinc telluride, and cadmium telluride.

5. The detector of claim 1, wherein each attenuating element of the plurality of attenuating elements comprises at least one of a cylindrical shape, a planar shape, a rectangular shape, and a polygonal shape.

6. The detector of claim 5, wherein each attenuating element of the plurality of attenuating elements comprises a three inch diameter sodium iodide (thallium) cylinder.

7. The detector of claim 5, wherein the plurality of attenuating elements further comprises two or more tiers of the plurality of attenuating elements in a predetermined configuration.

8. The detector of claim 1, wherein the active mask is configured to increase a photopeak efficiency for a 662 keV gamma-ray by at least about 25%.

9. The detector of claim 1, wherein the active mask is configured to increase a photopeak efficiency for low-energy gamma-rays by at least about 50%.

10. A stand-off radiation imaging and detection system, comprising:
a detector configured to identify and locate a radioisotope, the detector comprising:
a position sensitive detector configured to observe a location of a high energy radiation source, the position sensitive detector comprising a surface comprising a first radiation sensitive material, a surface of the position sensitive detector positioned within a plane; and
an active mask comprising a plurality of attenuating elements and a plurality of transparent elements positioned between the high energy radiation source and the position sensitive detector, the plurality of attenuating elements comprising a second radiation sensitive material and configured to resolve an energy of high energy radiation absorbed by the plurality of attenuating elements to identify the high energy radiation source.

11. The system of claim 10, wherein the first radiation sensitive material and the second radiation sensitive material comprise the same material.

12. The system of claim 10, wherein the first radiation sensitive material and the second radiation sensitive material comprise different materials.

13. The system of claim 10, wherein at least one of the first radiation sensitive material and the second radiation sensitive material comprises at least one of a scintillation material and a direct detection material, the scintillation material comprising at least one of sodium iodide, cesium iodide, sodium iodide (thallium), gadolinium oxyorthosilicate, bismuth germinate, and lutethium oxyorthosilicate, the direct detection material comprising at least one of germanium, cadmium zinc telluride, and cadmium telluride.

14. The system of claim 10, wherein each element of the plurality of attenuating and transparent elements comprises at least one of a cylindrical shape, a planar shape, a rectangular shape, and a polygonal shape.

15. The system of claim 10, wherein the detector comprises a total photopeak efficiency of at least about 60%.

16. The system of claim 10, wherein the detector is configured to detect at least about 35 gammas per second for a 1 milliCurie (mCi) Cesium 137 (137Cs) source located 100 meters (m) away.

17. The system of claim 10, wherein the detector is configured to detect at least about 60 gammas per second for a 1 milliCurie (mCi) Cesium 137 (137Cs) source located 100 meters (m) away.

18. The system of claim 10, wherein the position sensitive detector comprises a 3-inch thick planar array, wherein the planar array comprises a plurality of elements comprising the first radioisotope sensitive material.

19. The system of claim 10, wherein the detector is configured to produce signals corresponding to an energy and a pattern of the high energy radiation absorbed by the plurality of attenuating elements.

20. The system of claim 10, further comprising a computer coupled in communication with the detector, the computer configured to provide spectral information regarding an isotope emitting the high energy radiation based on the energy of the high energy radiation resolved by the plurality of attenuating elements.

* * * * *